C. FRANTZ.
GRAIN SEPARATOR.
APPLICATION FILED OCT. 8, 1917.
1,272,790.
Patented July 16, 1918.
2 SHEETS—SHEET 2.
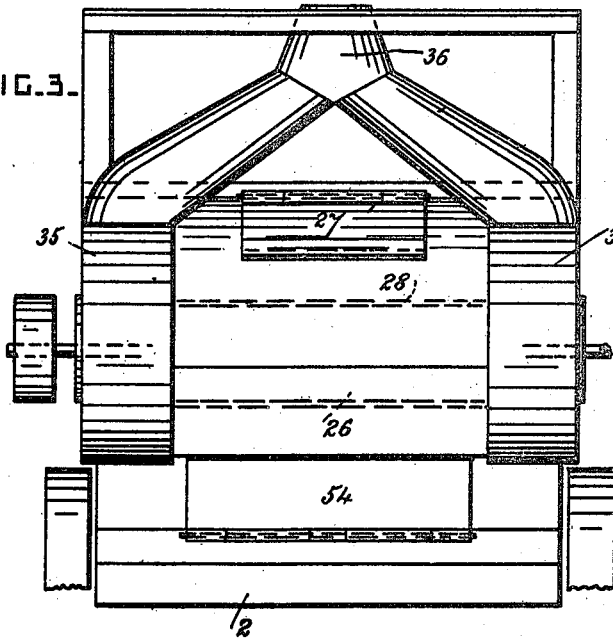
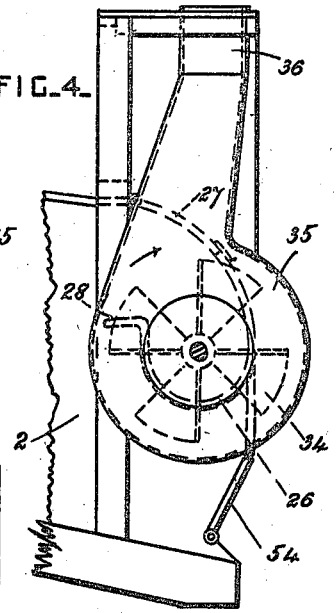
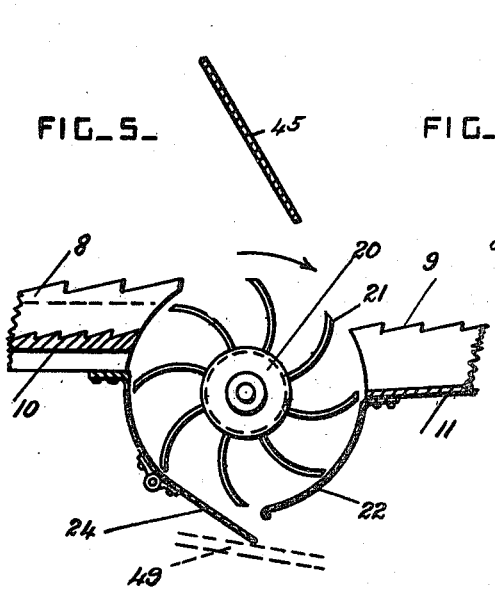
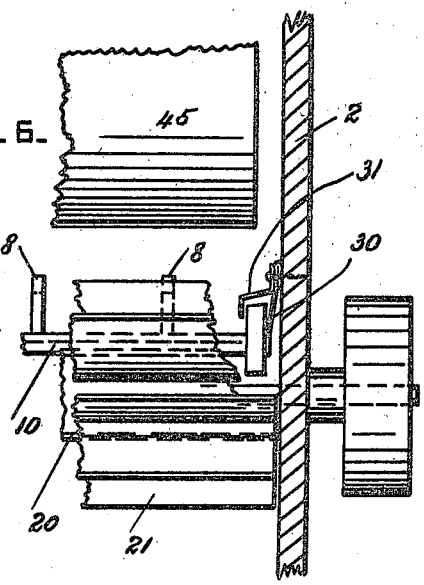
Inventor
Christian Frantz
by Herbert H. Jenner
Attorney

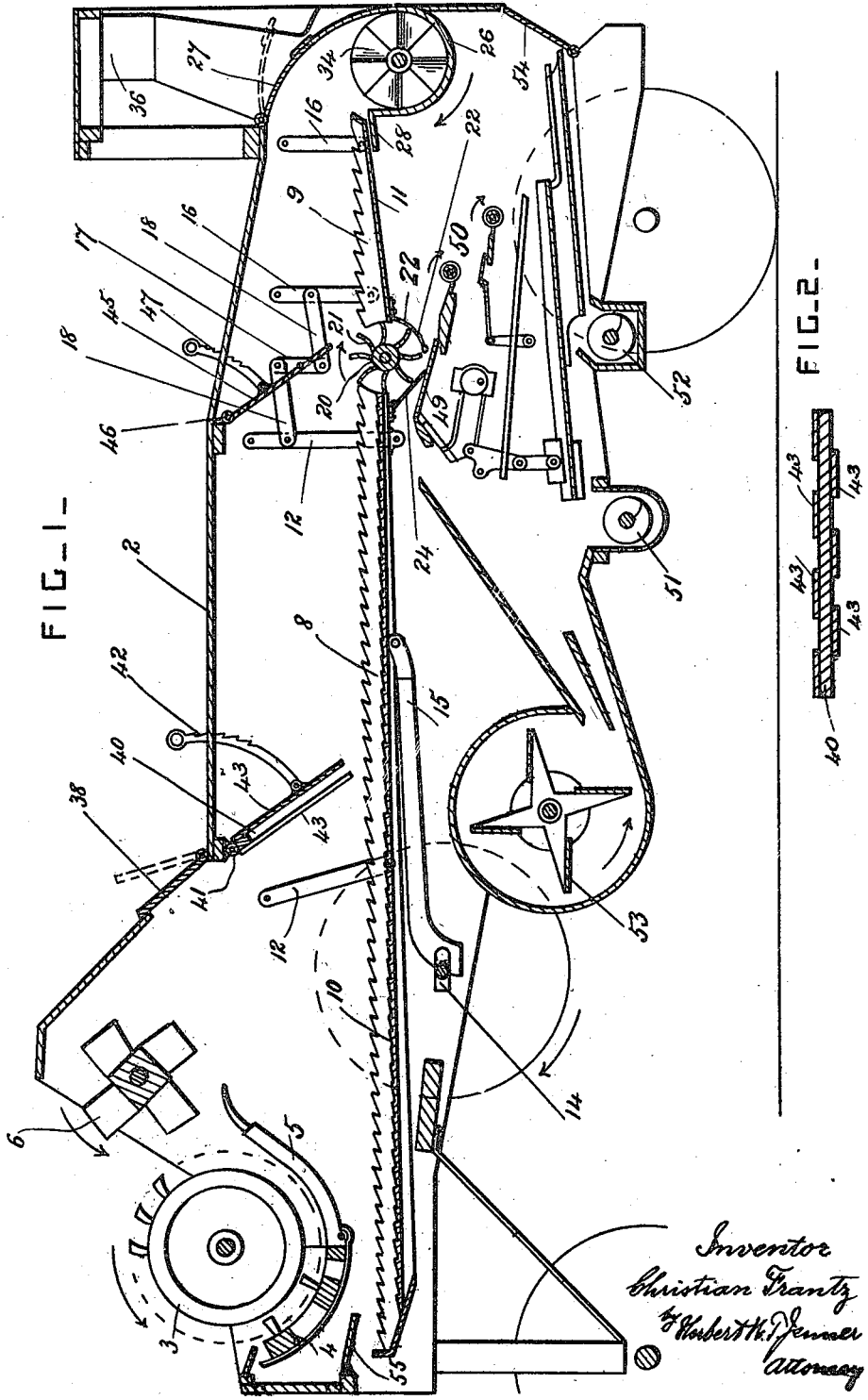

UNITED STATES PATENT OFFICE.

CHRISTIAN FRANTZ, OF NIAGARA FALLS, NEW YORK.

GRAIN-SEPARATOR.

1,272,790. Specification of Letters Patent. Patented July 16, 1918.

Application filed October 8, 1917. Serial No. 195,317.

*To all whom it may concern:*

Be it known that I, CHRISTIAN FRANTZ, a citizen of the United States, residing at Niagara Falls, in the county of Niagara and State of New York, have invented certain new and useful Improvements in Grain-Separators, of which the following is a specification.

This invention relates to grain separators provided with shaking tables or straw racks; and it consists in the novel method, and the construction and combination of the parts hereinafter fully described and claimed whereby the chaff is sucked out of the straw pneumatically without being passed downwardly through it and subsequently blown out of the machine.

In the drawings, Figure 1 is a longitudinal section through a grain separator constructed according to this invention. Fig. 2 is a detail plan view of the front straw deflector. Fig. 3 is a side view of one of the exhaust fans at the rear of the machine. Fig. 4 is a rear end view of the exhaust fans. Fig. 5 is a longitudinal section through the grain trap or outlet valve, drawn to a larger scale. Fig. 6 is an end view of one end portion of the grain trap, showing also the packing between the straw rack and the machine casing.

The casing 2 of the machine is of any approved construction, and threshing mechanism of any approved construction is provided at its front end. A revoluble toothed threshing cylinder 3 is shown, and a toothed concave, 4. A suitable grate or grain deflector 5 is arranged behind the concave, and a revoluble straw beater 6 is journaled above and behind the cylinder.

Much of the grain flies out from the heads as they pass between the toothed cylinder and concave, and is deflected downwardly onto the grain bottom 10 by the grate or deflector 5. The straw and chaff with some remaining grain pass over the top of the grate and under the beater. The previously threshed straw is here in a very loose mass, and has the light chaff driven into it and along with it by the blast formed by the revolving cylinder.

A substantially horizontal straw rack is provided and extends longitudinally in the machine casing. This straw rack is preferably formed in two sections 8 and 9, and each section has an imperforate grain bottom, 10 and 11, secured to it and extending its entire length. The longitudinal bars of the straw rack are serrated in the usual manner, and the grain bottoms are also serrated, or otherwise formed so as to move the grain endwise. The front section 8 of the straw rack, which is much longer than its rear section 9, is pivotally supported by links 12 which are pivoted to the casing 2. The straw rack is shaken in any approved way. A revoluble crank 14 is shown for shaking the straw rack longitudinally, and this crank is journaled below the straw rack, and is coupled to it by a connecting-rod 15.

The rear section 9 of the straw rack is pivotally supported by links 16 which are pivoted to the casing 2, and it is preferably shaken in the reverse direction from the front section. This reversal of motion is effected by means of a rocking-lever 17 which is pivoted centrally to the casing 2, and two rods 18 which are pivoted to the upper and lower ends of the rocking-lever. One of these rods is pivoted to the rear link 12 of the front section, and the other is pivoted to the front link 16 of the rear section.

A grain trap or outlet valve is provided between the adjacent ends of the two sections of the straw rack, and this valve preferably consists of a revoluble reel 20 having curved arms 21 of thin sheet metal. This reel is journaled in the casing 2, and is revolved continuously in the direction of the curved arrow adjacent to it by any approved driving mechanism, while the rack is being shaken. A curved guard plate 22 is secured to the front part of the rear section 9, and extends under the rear portion of the reel. A guide plate 24 is pivoted to the rear end of the front section, and projects rearwardly and downwardly under the front portion of the reel.

A trough 26 is provided at the rear end of the casing 2 for receiving the chaff and the straw from the straw rack. The rear end portion of the casing over the trough is closed, and a hinged door 27 is provided in it so that access to its interior may be had. This door can also be used as a damper to regulate the air current by admitting a little air at this point. A lip 28 projects forwardly from the front edge of the trough, under the rear end portion of the grain bottom of the rear section 9.

The upper part of the casing above the straw rack is open to the air at its front end, and a packing is provided between the sides of the straw rack and the sides of the casing. This packing preferably consists of a strip of heavy canvas 30, or similar flexible material. The upper edge of this strip is secured to the side of the casing 2, and its lower edge is caused to bear against the side of the straw rack by pneumatic pressure, or in any other convenient way. A metallic strip 31 is also secured to the side of the casing, and extends over the top of the side of the straw rack. This packing prevents air from being drawn upwardly through the spaces between the straw rack and the sides of the casing, and it prevents any grain from falling downwardly through the said spaces.

An exhaust fan, or other suitable pneumatic device, is provided at the rear end of the casing 2 to draw a strong current of air through the upper part of the casing over the straw rack. This pneumatic device preferably consists of two similar exhaust fans 34 journaled to run in fan casings 35 arranged at the ends of the trough 26, one on each side of the machine. These exhaust fans deliver into a forked pipe 36, and they may operate as a pneumatic straw stacker.

A hinged door 38 is preferably provided in the top of the casing 2, behind the beater, so as to admit air freely at this point when desirable. A front deflector 40 is pivoted by a hinge 41 to the top of the casing 2, behind the door 38, and extends rearwardly and downwardly. A rod or bar 42 is provided for adjusting the inclination of this deflector, and the deflector is preferably formed of two rows of slats 43 arranged in staggered relation so that the air may be drawn freely between them together with the chaff.

A rear deflector 45 is pivoted by a hinge 46 to the top of the casing, and is arranged in a rearwardly and downwardly inclined position, with its lower end over the grain trap or outlet valve This deflector 45 may be an imperforate plate, and it has a rod or bar 47 for adjusting its inclination.

The loose straw is consolidated and is pressed lightly on the straw rack by the front deflector. The remaining grain, which is thrown upwardly over the top of the grate 5 by the threshing cylinder, is also deflected by the front deflector 40, the staggered slats of which afford a free passage for the light chaff, but which stop the flying grain and prevent it from being drawn along with the chaff, and the light chaff is sucked out of the straw, by the current of air, and is removed by the exhaust fans. The straw is shaken by the straw rack, and the grain mixed with it falls by gravity onto the imperforate grain bottom of the straw rack.

The straw is again deflected as it passes over the grain trap, and is also shaken on the rear section of the straw rack. Any grain still remaining in the straw falls by gravity onto the imperforate bottom of the rear section. The longitudinal movements of the sections 9 and 10 of the straw rack are limited and controlled by the throw of the crank 14 which actuates them. When the sections 9 and 10 are moved apart they loosen the straw above the reel 20, and this assists in permitting the grain to fall freely by gravity at this point. Some air is drawn upwardly past the reel and assists in removing the chaff, and this upward air current is regulated by the plates 22 and 24. The deflector 45 is adjusted so as to depress the longitudinal air current over the reel, and cause the air current to act strongly on the chaff at this point.

The grain is delivered by the plates 22 and 24 of the grain trap or outlet valve onto the receiving shelf 49 of the cleaning mechanism 50, which is of any approved construction, and which is arranged directly under the grain trap, the usual chaffer being dispensed with. As the sections of the straw rack have imperforate bottoms secured to them, the straw separating mechanism is greatly simplified. It is found that the grain can be shaken from the straw much more easily when the light chaff is removed pneumatically from the loose straw and from its upper side, than when the straw and chaff are allowed to become matted, and the chaff is shaken out of the straw so that it falls downwardly with the grain by gravity from the straw rack, and is subsequently separated from the grain by a chaffer. The violent tossing motion of the straw racks ordinarily used is not necessary, as the straw does not require to be tossed upwardly in this machine The grain from the cleaning mechanism falls into a suitable grain spout or conveyer 51, and the tailings removed by the cleaning mechanism fall into the tailings spout or conveyer 52. A blast fan 53 of approved construction is provided for blowing a current of air rearwardly through the cleaning mechanism in the usual way. The hinged plate 24 and the grain outlet valve prevent the grain from being driven upwardly into the straw by the blast from the fan 53.

A hinged outlet door 54 is provided at the rear end of the casing 2 below the trough 26, but this door may be dispensed with if desired. A hinged door 55 may also be advantageously provided at the front end of the casing 2, between the concave and the front end portion of the straw rack, so as to regulate the admission of air at this point.

The various revoluble parts of the separator are revolved in the directions of the curved arrows marked adjacent to them, and by any approved driving devices, and the machine is mounted on ground wheels in the usual manner.

In Fig. 5 the rear part of the guide plate 24 is shown pivoted to its front part, and the grain bottom of the rear section of the straw rack is arranged a little below the level of the grain bottom of the front section. The arms 21 partially support the straw, and propel it rearwardly, and prevent it from falling between the grain bottoms when the sections of the straw rack are moved apart from the position shown in Fig. 5.

What I claim is:

1. A method of separating wheat or similar grain from straw and chaff, which consists in first separating the bulk of the grain from the current of grain and chaff discharged rearwardly by the threshing mechanism, drawing the light chaff directly from the loose previously threshed straw by pneumatic suction, thereby preventing the chaff from becoming matted with the straw, completely baffling the direct current or course of the flying grain and deflecting it and the loose straw into the lower part of the air current where the suction is not sufficient to carry off the grain, and simultaneously drawing off the light chaff by the full force of the air current from the upper side of the deflected straw, and permitting the grain to separate from the deflected straw by gravity.

2. In a grain separator, a casing provided with an air chamber, threshing mechanism which discharges into the front portion of the air chamber, means for separating the bulk of the grain from the current of grain and chaff as it enters the air chamber, a support for the grain and the straw in the air chamber, a pneumatic suction device having its inlet connected to the rear portion of the air chamber and operating to draw the light chaff directly from the loose straw in the front portion of the air chamber, thereby preventing the chaff from becoming matted with the straw, and means extending completely across the upper part of the air chamber and operating to baffle the direct current or course of the flying grain and to guide the grain and the straw into the lower part of the air current below the flying chaff, without obstructing the efflux of the chaff.

3. In a grain separator, a casing provided with an air chamber, threshing mechanism which discharges into the front portion of the air chamber, means for separating the bulk of the grain from the current of grain and chaff as it enters the air chamber, a support for the grain and the straw in the air chamber, a pneumatic suction device having its inlet connected to the rear portion of the air chamber and operating to draw the light chaff directly from the loose straw in the front portion of the air chamber, thereby preventing the chaff from becoming matted with the straw, and a deflecting device provided with tortuous air passages and extending completely across the upper part of the air chamber and operating to baffle the direct current or course of the flying grain and to guide the grain and the straw into the lower part of the air current below the flying chaff, without obstructing the efflux of the chaff.

4. In a grain separator, a casing provided with an air chamber, threshing mechanism which discharges into the front portion of the air chamber, means for separating the bulk of the grain from the current of grain and chaff as it enters the air chamber, a support for the grain and the straw in the air chamber provided with means for moving them both rearwardly and discharging the grain separately from the straw at the rear part of the air chamber, a pneumatic suction device having its inlet connected to the rear portion of the air chamber and operating to draw the light chaff directly from the loose straw in the front portion of the air chamber, thereby preventing the chaff from becoming matted with the straw, and means extending completely across the upper part of the air chamber and operating to baffle the direct current or course of the flying grain and to guide the grain and the straw into the lower part of the air current below the flying chaff, without obstructing the efflux of the chaff.

5. In a grain separator, a casing provided with an air chamber, threshing mechanism which discharges into the front portion of the air chamber, means for separating the bulk of the grain from the current of grain and chaff as it enters the air chamber, a support for the grain and the straw in the air chamber, a pneumatic suction device having its inlet connected to the rear portion of the air chamber and operating to draw the light chaff directly from the loose straw in the front portion of the air chamber, thereby preventing the chaff from becoming matted with the straw, means extending completely across the upper part of the air chamber and operating to baffle the direct current or course of the flying grain and to guide the grain and the straw into the lower part of the air current below the flying chaff, without obstructing the efflux of the chaff, and a trough extending crosswise of the casing in close proximity to the rear end of the said support and operating to conduct the straw directly from the support to the said suction device.

6. In a grain separator, a casing, a shaking straw rack provided with an imperforate grain bottom, strips of flexible packing material secured to the casing and bearing against the sides of the straw rack by pneumatic suction, thereby preventing the upward passage of air, guards secured to the casing and extending over the tops of the side portions of the straw rack, and a pneumatic suction device connected with the air space of the casing above the straw rack and operating to remove the chaff from the straw and to hold the said packing strips in engagement with the straw rack.

7. In a grain separator, a casing, a shaking straw rack provided with an imperforate grain bottom having a valved outlet for grain, and a pneumatic device operating to draw air through the casing above the straw rack to remove the chaff upwardly from the straw.

8. In a grain separator, a casing, a shaking straw rack provided with an imperforate grain bottom, a straw deflector pivoted to the casing over the straw rack and provided with passages for air and chaff, and a pneumatic device arranged at the rear end of the casing behind the deflector and operating to draw air through the casing to remove the chaff upwardly from the straw.

9. In a grain separator, a casing, a shaking straw rack provided with an imperforate grain bottom, a straw deflector pivoted to the casing and provided with slats arranged in staggered relation to permit the passage of air and chaff, and a pneumatic device arranged at the rear end of the casing and operating to draw air through the casing to remove the chaff upwardly from the straw.

10. In a grain separator, a casing, a shaking straw rack provided with an imperforate grain bottom, a straw deflector pivoted to the casing over the middle part of the straw rack and provided with passages for air and chaff, a second straw deflector pivoted in the rear end portion of the casing, and a pneumatic device arranged at the rear end of the casing and operating to draw air longitudinally over the straw rack to remove the chaff.

11. In a grain separator, a casing, a shaking straw rack provided with an imperforate grain bottom having a valved outlet for grain, a straw deflector pivoted to the casing and having its lower end arranged over and adjacent to the said outlet, and a pneumatic device operating to draw air through the casing and over the straw rack to remove the chaff.

12. In a grain separator, a casing, a shaking straw rack provided with an imperforate grain bottom having a grain outlet, a valve controlling the said outlet and operated continuously while the straw rack is in action, and a pneumatic device operating to draw air through the casing and over the straw rack to remove the chaff.

13. In a grain separator, a casing, a shaking straw rack provided with an imperforate grain bottom having a grain outlet, a rotary valve journaled in the said outlet, and a pneumatic device operating to draw air through the casing and over the straw rack to remove the chaff.

14. In a grain separator, a casing, a shaking straw rack provided with an imperforate grain bottom having a valved grain outlet, cleaner mechanism arranged under the straw rack and receiving the grain directly from the said outlet, and a pneumatic device operating to draw air through the casing and over the straw rack to remove the chaff.

15. In a grain separator, a casing, a straw rack formed in two sections each provided with an imperforate grain bottom, means for shaking the said sections longitudinally in opposite directions, a grain outlet valve arranged between the adjacent ends of the sections, and a pneumatic device operating to draw air through the casing and over the straw rack to remove the chaff.

16. In a grain separator, a casing, a straw rack formed in two sections arranged endwise and each provided with an imperforate grain bottom, means for shaking the front section longitudinally, pivoted lever mechanism connecting the sections so that the rear section is shaken from the front section but in the reverse direction, a grain outlet valve arranged between the adjacent ends of the sections, and a pneumatic device operating to draw air through the casing and over the straw rack to remove the chaff.

17. In a grain separator, a casing, a straw rack formed in two sections provided with imperforate grain bottoms having at their adjacent ends downwardly extending guide plates for the grain, a rotary grain outlet valve journaled in the casing between the adjacent ends of the said sections and over the said guide plates, means for shaking the said sections in opposite directions, and a pneumatic device operating to draw air through the casing and over the straw rack to remove the chaff.

18. In a grain separator, a casing, threshing mechanism arranged at one end of the casing, a shaking straw rack receiving straw, chaff and grain from the threshing mechanism, said straw rack being provided with an imperforate grain bottom having a valved grain outlet and working substantially airtight in the casing, and a pneumatic device arranged at the other end of the casing and operating to draw air from the front end of the casing over the said straw rack to remove the chaff.

19. In a grain separator, a casing, a shaking straw rack provided with an imperforate grain bottom having an outlet for grain, a deflector arranged in the casing over the said outlet, and a pneumatic device operating to draw air through the casing between the straw rack and the deflector to remove the chaff from the straw.

20. In a grain separator, a shaking straw rack provided with an imperforate bottom having an outlet for grain, means for regulating the upward passage of air through the said outlet, and a pneumatic device operating to draw air upwardly through the said outlet to assist in removing the chaff from the straw.

In testimony whereof I have affixed my signature.

CHRISTIAN FRANTZ.